(12) United States Patent
Hwang et al.

(10) Patent No.: US 10,755,673 B2
(45) Date of Patent: Aug. 25, 2020

(54) METHODS AND SYSTEMS FOR ADJUSTING CONTRAST IN DEVICES

(71) Applicant: Schepens Eye Research Institute, Boston, MA (US)

(72) Inventors: Daejoon Alex Hwang, Boston, MA (US); Eliezer Peli, Boston, MA (US)

(73) Assignee: Schepens Eye Research Institute, Boston, MA (US)

( * ) Notice: Subject to any disclaimer, the term of this patent is extended or adjusted under 35 U.S.C. 154(b) by 0 days.

(21) Appl. No.: 16/303,090

(22) PCT Filed: May 19, 2017

(86) PCT No.: PCT/US2017/033500
§ 371 (c)(1),
(2) Date: Nov. 19, 2018

(87) PCT Pub. No.: WO2017/201384
PCT Pub. Date: Nov. 23, 2017

(65) Prior Publication Data
US 2019/0172419 A1 Jun. 6, 2019

Related U.S. Application Data

(60) Provisional application No. 62/339,601, filed on May 20, 2016.

(51) Int. Cl.
*G09G 5/10* (2006.01)
*G06T 5/00* (2006.01)

(52) U.S. Cl.
CPC .............. *G09G 5/10* (2013.01); *G06T 5/009* (2013.01); *G09G 2320/066* (2013.01);
(Continued)

(58) Field of Classification Search
CPC .............. G09G 5/10; G09G 2320/0626; G09G 2320/066; G09G 2360/14; G09G 2360/144; G09G 2360/145; G09G 2360/16
See application file for complete search history.

(56) References Cited

U.S. PATENT DOCUMENTS

2012/0001833 A1\* 1/2012 Lindig ................. G02B 27/017
345/8
2012/0154355 A1 6/2012 Kawai et al.
(Continued)

OTHER PUBLICATIONS

Burkhardt et al., "Symmetry and constancy in the perception of negative and positive luminance contrast," JOSA A, 1984, 1(3): 309-316.
(Continued)

*Primary Examiner* — Robert J Michaud
(74) *Attorney, Agent, or Firm* — Fish & Richardson P.C.

(57) ABSTRACT

The disclosure features information display systems that include a display device, at least one sensor, and an electronic processor connected to the display device and to the at least one sensor. During operation of the system, for a set of pixels of the display device that are used to display visual information, the electronic processor is configured to determine a range of target luminance values for a subset of the pixels for which a Weber contrast value is less than the contrast threshold value, adjust luminance values for the set of pixels so that at least some members of the subset of pixels have Weber contrast values, based on their adjusted luminance values, that exceed the contrast threshold value, and display the visual information on the display device using the members of the set of pixels with the adjusted pixel luminance values.

19 Claims, 8 Drawing Sheets

(52) U.S. Cl.
CPC ........... *G09G 2320/0673* (2013.01); *G09G 2360/144* (2013.01); *G09G 2360/16* (2013.01)

(56) References Cited

U.S. PATENT DOCUMENTS

| | | | | |
|---|---|---|---|---|
| 2013/0215093 | A1* | 8/2013 | Bergquist | G09G 3/3208 345/207 |
| 2014/0088380 | A1* | 3/2014 | Sprigle | G01J 3/2823 600/306 |
| 2015/0117775 | A1 | 4/2015 | Abe et al. | |

OTHER PUBLICATIONS

International Preliminary Report on Patentability in International Application No. PCT/US2017/0033500, dated Nov. 29, 2018, 10 pages.

International Search Report and Written Opinion in International Application No. PCT/US2017/0033500, dated Aug. 11, 2017, 20 pages.

Kelley et al., "Display daylight ambient contrast measurement methods and daylight readability", Journal of the Society for Information Display, 2006, 14(11): 1019-1030.

Legge and Kersten. "Light and dark bars; contrast discrimination," Vision Research, 1983, 23(5): 473-483.

Mantyjarvi and Laitinen, "Normal values for the Pelli-Robson contrast sensitivity test," Journal of Cataract & Refractive Surgery, 2001, 27(2): 261-266.

Peli et al., "Effect of luminance on suprathreshold contrast perception," JOSA A, 1991, 8(8): 1352-1359.

Peli. "Display nonlinearity in digital image processing for visual communications," Optical Engineering, 1992, 31(11), 2374-2382.

Peli. "Suprathreshold contrast perception across differences in mean luminance: effects of stimulus size, dichoptic presentation, and length of adaptation," JOSA A., 1995, 12(5): 817-823.

Penczek et al., "General Metrology Framework for Determining the Ambient Optical Performance of Flat Panel Displays," In SID Symposium Digest of Technical Papers, 2015, 46(1): 727-730.

Penczek et al., "Optical Measuring Methods for Transparent Displays," In SID Symposium Digest of Technical Papers, 2015, 46(1): 731-734.

\* cited by examiner

METHODS AND SYSTEMS FOR ADJUSTING CONTRAST IN DEVICES

CROSS-REFERENCE TO RELATED APPLICATIONS

This application is a 371 U.S. National Phase Application of PCT/US2017/033500, filed on May 19, 2017, which claims priority to U.S. Provisional Patent Application No. 62/339,601, filed on May 20, 2016, the entire contents of which are incorporated by reference herein.

STATEMENT OF GOVERNMENT RIGHTS

This work was supported in part by NIH grant R01EY024075. The United States government has certain rights in the invention.

TECHNICAL FIELD

This specification relates to methods and system of adjusting contrast for display devices.

BACKGROUND

Contrast ratio (CR) has been used as a metric of display performance for presenting visible luminance differences. The contrast ratio depends on minimum and maximum luminance pixel values, e.g. pixel values of 0 and 255 in an 8-bit display system, as measured in total darkness. This metric can be modified to address performance of a display under varying ambient luminance conditions. To compute the contrast ratio under varying ambient luminance conditions, a model of a viewing scenario for displays can assume a single ambient light source. Reflected light and transmitted light can be computed based on reflectance and transmittance of a display and can be linearly superposed to the display produced minimum and maximum luminance to estimate a performance of a display based on the contrast ratio with the impact of ambient light.

SUMMARY

The methods and systems disclosed herein feature steps and components for determining measures of contrast in displayed information (e.g., images, text, and graphical information), and for modifying display devices to provide improved rendering of the displayed information based on human viewer's contrast sensitivity. In particular, the methods and systems can be used to improve an existing display device's performance so that information is displayed in a manner that takes account of the human ability to perceive contrast particularly under different levels of ambient light.

In a first aspect, the disclosure features information display systems that include a display device configured to display visual information to a viewer, at least one sensor configured to measure information about ambient light in an environment surrounding the display device, and an electronic processor connected to the display device and to the at least one sensor, where during operation of the system, for a set of pixels of the display device that are used to display the visual information, the electronic processor is configured to: obtain the information about the ambient light from the at least one sensor; obtain information about target luminance values and background luminance values for the set of pixels; obtain a contrast threshold value for the viewer; determine a Weber contrast value for each one of the set of pixels; determine a range of luminance values for a subset of the pixels for which the Weber contrast value is less than the contrast threshold value; adjust luminance values for the set of pixels so that at least some members of the subset of pixels have Weber contrast values, based on their adjusted luminance values, that exceed the contrast threshold value; and display the visual information on the display device using the members of the set of pixels with adjusted luminance values.

Embodiments of the systems can include any one or more of the following features.

The systems can include a contrast sensitivity measurement apparatus, where the contrast sensitivity measurement apparatus is configured to determine the contrast threshold value for the viewer.

The electronic processor can be configured to adjust luminance values of background pixels, target pixels, or both for the set of pixels by remapping the luminance values to a range of luminance values for which corresponding Weber contrast values exceed the contrast threshold value.

The electronic processor can be configured to adjust the luminance values for the set of pixels by remapping at least some of the luminance values corresponding to pixels for which the Weber contrast value is less than the contrast threshold value to larger luminance values. The electronic processor can be configured to adjust the luminance values for the set of pixels by remapping at least some of the values corresponding to pixels for which the Weber contrast value is larger than the contrast threshold value to smaller luminance values. The electronic processor can be configured to adjust the luminance values for the set of pixels by remapping at least some of the luminance values so that a range of luminance values for the set of pixels, defined by a difference between maximum and minimum luminance values among the set of pixels, is smaller after the adjustment than before the adjustment.

For each one of the set of pixels that corresponds to a positive contrast polarity, the electronic processor can be configured to determine the Weber contrast value based on a quotient that includes a numerator featuring the target luminance value of a pixel, and a denominator featuring a sum of the target luminance value of the pixel and an ambient luminance value of the pixel. The numerator can include a difference between the target luminance value of the pixel and the background luminance value of the pixel.

For each one of the set of pixels that corresponds to a positive contrast polarity, the electronic processor can be configured to determine the Weber contrast value based on a term calculated according to:

$$WC_{Positive} = \frac{(L_{Target} - L_{Background})}{(L_{Target} + L_{Ambient})}$$

where $WC_{Positive}$ is the Weber contrast value, $L_{target}$ is the target luminance value of a pixel, $L_{background}$ is the background luminance value of the pixel, and $L_{ambient}$ is an ambient luminance value of the pixel.

For each one of the pixels that corresponds to a negative contrast polarity, the electronic processor can be configured to determine the Weber contrast value based on a quotient that includes a numerator featuring the target luminance value of a pixel, and a denominator featuring a sum of the target luminance value of the pixel and an ambient luminance value of the pixel. The numerator can include a difference between the background luminance value of the pixel and the target luminance value of the pixel.

For each one of the set of pixels that corresponds to a negative contrast polarity, the electronic processor can be configured to determine the Weber contrast value based on a term calculated according to:

$$WC_{Negative} = \frac{(L_{Background} - L_{Target})}{(L_{Background} + L_{Ambient})}$$

where $WC_{Negative}$ is the Weber contrast value.

The information about the ambient light can include, for each one of the set of pixels, a reflected luminance value corresponding to ambient light reflected from the one pixel, and a transmitted luminance value corresponding to ambient light transmitted through the one pixel.

The electronic processor can be configured to obtain the information about the ambient light by deactivating the display device, and using the at least one sensor to measure luminance values corresponding to ambient light reflected from, and transmitted through, the display device.

The electronic processor can be configured to identify the subset of pixels for which the Weber contrast value is less than the contrast threshold value by: for each one of the set of pixels, determining a set of Weber contrast values based on a pixel's target luminance value, an ambient luminance value for the pixel, and a set of background luminance values for the pixel; and identifying the pixel as a member of the subset of pixels if at least one member of the set of Weber contrast values is less than the contrast threshold value.

Embodiments of the systems can also include any of the other features disclosed herein, including features disclosed in different embodiments, in any combination as appropriate.

In another aspect, the disclosure features methods for displaying information on a display device that include: obtaining information about ambient light in an environment surrounding the display device; for a set of pixels on the display device that are used to display the information; obtaining information about target luminance values and background luminance values for each of the pixels; obtaining information about a contrast threshold value for a viewer of the display device; determining a Weber contrast value for each one of the set of pixels; determining a range of luminance values for a subset of the pixels for which the Weber contrast value is less than the contrast threshold value; adjusting luminance values for the set of pixels so that at least some members of the subset of pixels have Weber contrast values, based on their adjusted luminance values, that exceed the contrast threshold value; and displaying the visual information on the display device using the members of the set of pixels with the adjusted luminance values.

Embodiments of the methods can include any one or more of the following features.

The methods can include determining the contrast threshold value for the viewer.

The methods can include adjusting the luminance values for the set of pixels by remapping the luminance values to a range of luminance values for which corresponding Weber contrast values exceed the contrast threshold value. The methods can include adjusting the luminance values for the set of pixels by remapping the luminance values to a range of luminance values having a lower bounding luminance value for which a corresponding Weber contrast value is equal to the contrast threshold value.

The methods can include adjusting the luminance values for the set of pixels by remapping at least some of the luminance values corresponding to pixels for which the Weber contrast value is less than the contrast threshold value to larger luminance values. The methods can include adjusting the luminance values for the set of pixels by remapping at least some of the luminance values corresponding to pixels for which the Weber contrast value is larger than the contrast threshold value to smaller luminance values. The methods can include adjusting the luminance values for the set of pixels by remapping at least some of the luminance values so that a range of luminance values for the set of pixels, defined by a difference between maximum and minimum luminance values among the set of pixels, is smaller after the adjustment than before the adjustment.

The methods can include, for each one of the set of pixels that corresponds to a positive display polarity, determining the Weber contrast value based on a quotient that includes a numerator featuring the target luminance value of a pixel, and a denominator featuring a sum of the target luminance value of the pixel and an ambient luminance value of the pixel. The numerator can include a difference between the target luminance value of the pixel and the background luminance value of the pixel.

The methods can include, for each one of the set of pixels that corresponds to a positive display polarity, determining the Weber contrast value based on a term calculated according to:

$$WC_{Positive} = \frac{(L_{Target} - L_{Background})}{(L_{Target} + L_{Ambient})}$$

where $WC_{Positive}$ is the Weber contrast value, $L_{target}$ is the target luminance value of the pixel, $L_{background}$ is the background luminance value of a pixel, and $L_{ambient}$ is an ambient luminance value of the pixel.

The methods can include, for each one of the pixels that corresponds to a negative contrast polarity, determining the Weber contrast value based on a quotient that includes a numerator featuring the target luminance value of the pixel, and a denominator featuring a sum of the target luminance value of the pixel and an ambient luminance value of a pixel. The numerator can include a difference between the background luminance value of the pixel and the target luminance value of the pixel.

The methods can include, for each one of the set of pixels that corresponds to a negative display polarity, determining the Weber contrast value based on a term calculated according to:

$$WC_{Negative} = \frac{(L_{Background} - L_{Target})}{(L_{Background} + L_{Ambient})}$$

where $WC_{Negative}$ is the Weber contrast value.

The information about the ambient light can include, for each one of the set of pixels, a reflected luminance value corresponding to ambient light reflected from the one pixel, and a transmitted luminance value corresponding to ambient light transmitted through the one pixel. The methods can include obtaining the information about the ambient light by deactivating the display device, and measuring luminance values corresponding to ambient light reflected from, and transmitted through, the display device.

The methods can include identifying the subset of pixels for which the Weber contrast value is less than the contrast threshold value by: for each one of the set of pixels, determining a set of Weber contrast values based on a pixel's target luminance value, an ambient luminance value for the pixel, and a set of background luminance values for the pixel; and identifying the pixel as a member of the subset of pixels if at least one member of the set of Weber contrast values is less than the contrast threshold value.

Embodiments of the methods can also include any of the other features disclosed herein, including features disclosed in connection with different embodiments, in any combination as appropriate.

In a further aspect, the disclosure features imaging devices that include an image sensor configured to obtain an image, and an electronic processor connected to the image sensor, where during operation of the device, for a set of pixels corresponding to a first image obtained by the image sensor, the electronic processor is configured to: obtain information about ambient light in an environment of the device; obtain information about target luminance values and background luminance values for the set of pixels; obtain a contrast threshold value; determine a Weber contrast value for each one of the set of pixels; determine a range of luminance values for a subset of the pixels for which the Weber contrast value is less than the contrast threshold value; adjust luminance values for the set of pixels so that at least some members of the subset of pixels have Weber contrast values, based on their adjusted luminance values, that exceed the contrast threshold value; and generate a second image based on the set of pixels and comprising the adjusted luminance values.

Embodiments of the devices can include any one or more of the following features.

The electronic processor can be configured to adjust the luminance values for the set of pixels by remapping the luminance values to a range of luminance values for which corresponding Weber contrast values exceed the contrast threshold value.

The electronic processor can be configured to adjust the luminance values for the set of pixels by remapping the luminance values to a range of luminance values having a lower bounding luminance value for which a corresponding Weber contrast value is equal to the contrast threshold value.

The electronic processor can be configured to adjust the luminance values for the set of pixels by remapping at least some of the luminance values corresponding to pixels for which the Weber contrast value is less than the contrast threshold value to larger luminance values. The electronic processor can be configured to adjust the luminance values for the set of pixels by remapping at least some of the luminance values corresponding to pixels for which the Weber contrast value is larger than the contrast threshold value to smaller luminance values. The electronic processor can be configured to adjust the luminance values for the set of pixels by remapping at least some of the luminance values so that a range of luminance values for the set of pixels, defined by a difference between maximum and minimum luminance values among the set of pixels, is smaller after the adjustment than before the adjustment.

For each one of the set of pixels that corresponds to a positive display polarity, the electronic processor can be configured to determine the Weber contrast value based on a quotient that includes a numerator featuring the target luminance value of a pixel, and a denominator featuring a sum of the target luminance value of the pixel and an ambient luminance value of the pixel. The numerator can include a difference between the target luminance value of the pixel and the background luminance value of the pixel.

For each one of the set of pixels that corresponds to a positive display polarity, the electronic processor can be configured to determine the Weber contrast value based on a term calculated according to:

$$WC_{Positive} = \frac{(L_{Target} - L_{Background})}{(L_{Target} + L_{Ambient})}$$

where $WC_{Positive}$ is the Weber contrast value, $L_{target}$ is the target luminance value of a pixel, $L_{background}$ is the background luminance value of the pixel, and $L_{ambient}$ is an ambient luminance value of the pixel.

For each one of the pixels that corresponds to a negative display polarity, the electronic processor can be configured to determine the Weber contrast value based on a quotient that includes a numerator featuring the target luminance value of a pixel, and a denominator featuring a sum of the target luminance value of the pixel and an ambient luminance value of the pixel. The numerator can include a difference between the background luminance value of the pixel and the target luminance value of the pixel.

For each one of the set of pixels that corresponds to a negative display polarity, the electronic processor can be configured to determine the Weber contrast value based on a term calculated according to:

$$WC_{Negative} = \frac{(L_{Background} - L_{Target})}{(L_{Background} + L_{Ambient})}$$

where $WC_{Negative}$ is the Weber contrast value.

The information about the ambient light can include, for each one of the set of pixels, a reflected luminance value corresponding to ambient light reflected from a pixel, and a transmitted luminance value corresponding to ambient light transmitted through the pixel. The electronic processor can be configured to obtain the information about the ambient light by deactivating the display device, and using the at least one sensor to measure luminance values corresponding to ambient light reflected from, and transmitted through, the display device.

The electronic processor can be configured to identify the subset of pixels for which the Weber contrast value is less than the contrast threshold value by: for each one of the set of pixels, determining a set of Weber contrast values based on a pixel's target luminance value, an ambient luminance value for the pixel, and a set of background luminance values for the pixel; and identifying the pixel as a member of the subset of pixels if at least one member of the set of Weber contrast values is less than the contrast threshold value.

Embodiments of the devices can also include any of the other features disclosed herein, including features disclosed in different embodiments, in any combination as appropriate.

Advantages of the methods and systems disclosed herein may include, but are not limited to, the advantages described below and elsewhere. The methods and systems can adjust images, graphical elements, and text luminance on a display device in varying ambient lighting conditions, thus enabling a user of the display device to move through various environments having different ambient lighting conditions while the visibility of the images, graphical elements, and text on the display device is maintained. The methods and systems can also be used to adjust the display characteristics according to other ambient lighting conditions specific to the display device. For a see-through display as an example, the display device can be adjusted to account for the greater or lesser transmission of ambient light through the display to improve visibility of image and text on a display device. In doing so, the adjustment can be performed by accounting for the adaptation of the viewer's visual system to the changes in ambient lighting conditions, thereby enhancing the viewer's ability to perceive contrast in the displayed information.

Unless otherwise defined, all technical and scientific terms used herein have the same meaning as commonly understood by one of ordinary skill in the art. Methods and materials described herein are for illustration purposes; other suitable methods and materials known in the art can also be used. The materials, methods, and examples are and not intended to be limiting. All publications, patent applications, patents, sequences, database entries, and other references mentioned herein are incorporated by reference in their entirety. References parenthetically cited are listed herein below. In case of conflict, the present specification, including definitions, will control.

The details of one or more implementations of the subject matter described in this specification are set forth in the accompanying drawings and the description below. Other potential features, aspects, and advantages will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
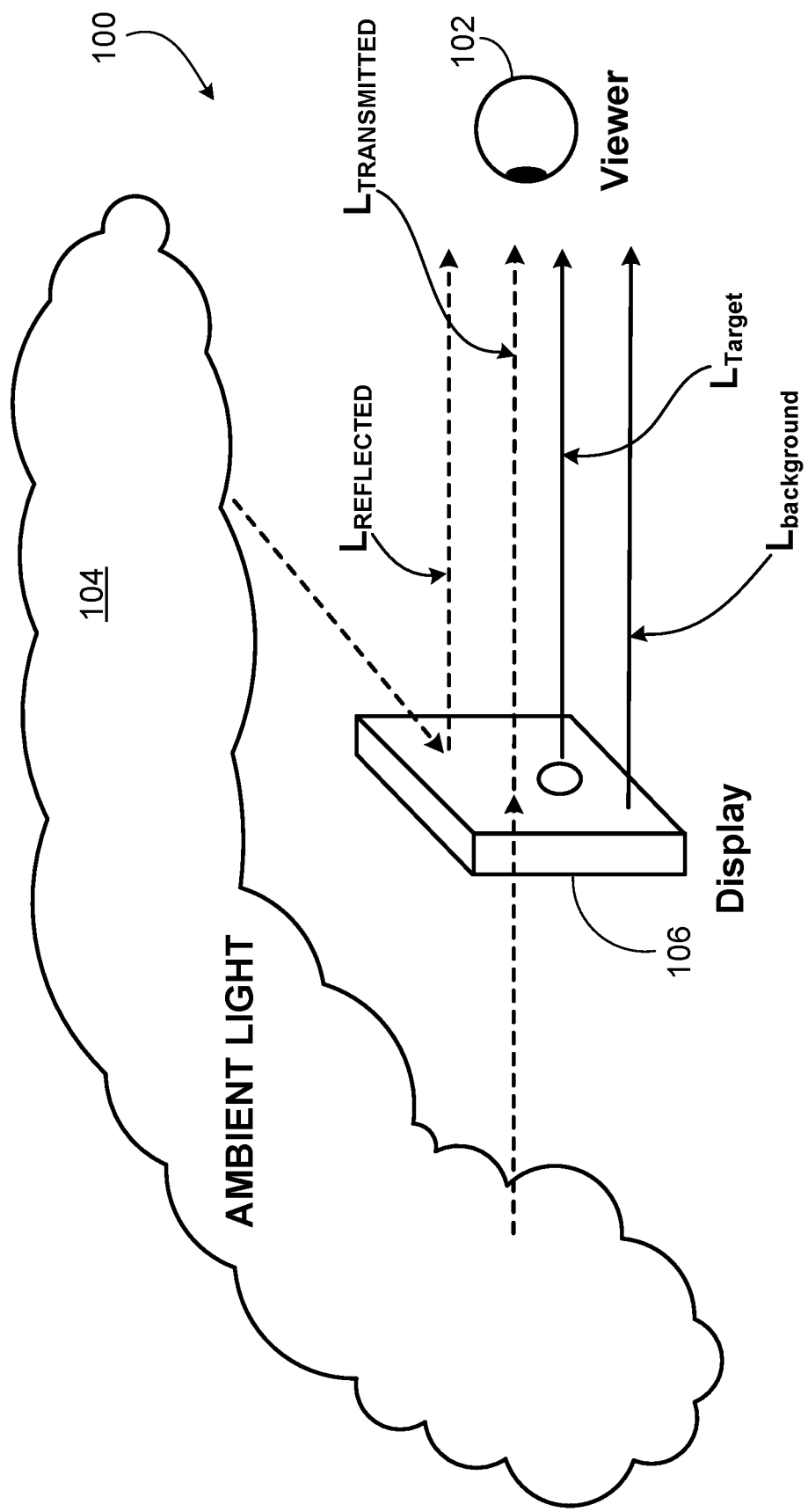
FIG. 1 is a schematic view of a display system viewed by an observer in an environment where it is affected by ambient light.

The contrast ratio (CR) has been used by the display industry as a metric of display performance for presenting visible luminance or brightness differences. However, this metric can misrepresent the performance of a display under varying ambient luminance conditions, because it depends only on minimum and maximum pixel value luminance (e.g., values of 0 and 255 on an 8-bit scale) measured in total darkness. CR does not account for a viewer's response to changes in ambient lighting conditions. When the amount of ambient light changes, the human visual system adapts to such changes, which affects a viewer's ability to perceive contrast in visual information. Conventional metrics such as contrast ratio do not account for local adaptations by a viewer's visual system.

To account for adaptations by the viewer's visual system to changes in ambient lighting conditions, the systems and methods disclosed herein use a contrast metric based on a perceptually appropriate modified Weber contrast (mWC) to determine effective contrast among displayed pixel intensities as perceived by a human observer, taking into account varying ambient light conditions. The mWC represents the visibility of luminance differences among all possible combinations of pixel values, while also taking into account luminance adaptation of the human vision system.

The systems and methods disclosed herein can use computed mWC to calculate display performance by a display device, and to adjust parameters of the display device to improve visibility of displayed information to an observer or viewer who is viewing the displayed information on the display device under a range of ambient lighting conditions. The ambient lighting conditions can affect a contrast of the information displayed on the display device and thereby adversely affect the visibility of the images for the user. By using a metric based on a mWC, the systems and methods can also adjust display devices to improve the display of information thereon based on the viewer's dynamic adaptation to different ambient light levels. Thus, by operating display devices based on mWC-based metrics, the systems and methods disclosed herein can dynamically adjust individual pixels of displayed information so that the information is visible under a wide variety of ambient lighting conditions.

In some embodiments, the systems and methods disclosed herein compute a single value or index of a display device for a given ambient lighting condition. In general, the index provides a measurement or evaluation criterion, and is computed based on a model of contrast perception that accounts for various factors relevant to the human perception of visual information.

In certain embodiments, the index can be a ratio of number of visible pixel values over 256 pixel values (e.g., over an 8-bit range of values from 0 to 255) to indicate the pixel values that are adequately visible under a given ambient lighting condition and the pixel values that are not adequately visible or are difficult to discern under the given ambient lighting condition. The index can indicate, for example, a range of the pixel luminance values over which a given pixel is discernable against ambient light, and a range of pixel luminance values for which the pixel is inadequately visible by a viewer. Pixels that are inadequately viewable correspond to display information that, in general, is not perceived by the viewer.

FIG. 1 depicts an example display system 100 that uses the methods disclosed herein to display visual information to a viewer 102 in an environment with ambient light 104, by implementing a contrast perception model that accounts for variations in ambient light and the viewer's contrast perception based on his or her luminance adaptation. A display device 106 shows information (e.g., image information such as a target image, text or other alphanumeric information, graphical information) against a background of emitted light. In general, display 106 can be a see-through (i.e., translucent or transparent) display or an opaque display. For example, in some embodiments, the display device 106 is for a desktop computing device, or a mobile computing device (cell phone or tablet). In certain embodiments, the display device 106 is a transparent or translucent display as used in a heads-up display or a head-mounted display. The display device 106 can alternatively be an augmented reality or holographic display.

As shown in FIG. 1, light emitted from the display device 106 and perceived by the viewer 102 can be derived from several sources. The target luminance, $L_{target}$, corresponds to light emitted from the display device 106 and corresponding to the displayed information. The background luminance, $L_{background}$, corresponds to background light emitted from the display device 106, and may correspond to displayed background information, or may arise from incomplete extinction of emitted light from pixels that are not used to display information. $L_{transmitted}$ and $L_{reflected}$ correspond to luminance levels of ambient light transmitted through, and reflected from, the display device 106, respectively.

Each of the foregoing components of luminance shown in FIG. 1 can be measured independently. $L_{Target}$ and $L_{Background}$ can be measured under completely dark conditions, i.e., with no ambient light present. $L_{Reflected}$ and $L_{Transmitted}$ can be measured with ambient light present, but with the display device 106 turned off, so that $L_{Target}$ and $L_{Background}$ are both zero.

In summary, in the display viewing model implemented in the systems and methods disclosed herein, the perceived luminance of each pixel is composed of the sum of the display emitted luminance (the sum of $L_{Target}$ and $L_{Background}$, measured in the absence of ambient light) and the luminance due to the ambient light, $L_{Ambient}$. In turn, $L_{Ambient}$, as perceived by the viewer, corresponds to the sum of $L_{Reflected}$ and $L_{Transmitted}$:

$$L_{Ambient} = L_{Reflected} + L_{Transmitted} \quad (1)$$

$L_{Target}$ is generally defined as being in a positive polarity condition when the target displayed is brighter than the background (i.e., for a given pixel, $L_{target} > L_{background}$), or in a negative polarity condition when the target displayed is darker than the background (i.e., for a given pixel, $L_{target} < L_{background}$).

A pixel's contrast ratio, which is a metric that is conventionally used by the display industry as discussed above, can then be computed for either a positive polarity condition or a negative polarity condition under ambient light conditions, using Equation (2) or (3) as follows (see, for example, References 1 & 2):

$$CR_{Positive} = \frac{(L_{Target} + L_{Ambient})}{(L_{Background} + L_{Ambient})} \quad (2)$$

$$CR_{Negative} = \frac{(L_{Background} + L_{Ambient})}{(L_{Target} + L_{Ambient})} \quad (3)$$

However, as discussed above, Equations (2) and (3) do not take account of the adaptation of the human visual system to changes in luminance. Human vision achieves high dynamic range through retinal (and other, i.e., pupillary) adaptation. As the overall luminance of a scene increases or decreases, the viewer's visual system normalizes the target to background luminance difference and perceives the same contrast. For example, a large absolute luminance difference displayed under high overall luminance conditions is perceived to have the same contrast as a lower absolute luminance difference displayed under low overall luminance conditions.

Because the contrast ratio metric does not take account of this adaptation by the viewer, the systems and methods disclosed herein instead determine a measure of a viewer's perception of contrast for a given pixel (i.e., the visibility of the pixel to the viewer) by calculating a modified Weber contrast value for the pixel. As above, the Weber contrast value can be determined for both positive and negative polarity conditions from Equations (4) and (5), respectively, as follows:

$$WC_{Positive} = \frac{(L_{Target} + L_{Ambient}) - (L_{Background} + L_{Ambient})}{(L_{Target} + L_{Ambient})} = \frac{(L_{Target} - L_{Background})}{(L_{Target} + L_{Ambient})} \quad (4)$$

$$WC_{Negative} = \frac{(L_{Background} + L_{Ambient}) - (L_{Target} + L_{Ambient})}{(L_{Background} + L_{Ambient})} = \frac{(L_{Background} - L_{Target})}{(L_{Background} + L_{Ambient})} \quad (5)$$

In the computation of the modified Weber contrast value for a given pixel, the ambient light components $L_{Reflected}$ and $L_{Transmitted}$ only affect the denominator. The presence of these components in the denominator represents the visual adaptation to the ambient light level by the viewer 102. Modified Weber contrast values for individual pixels can then be used to determine display performance and to modify the manner in which information is shown on a display device to improve the viewer's ability to perceive contrast among individual pixels in a variety of luminance conditions.

Figure 2:
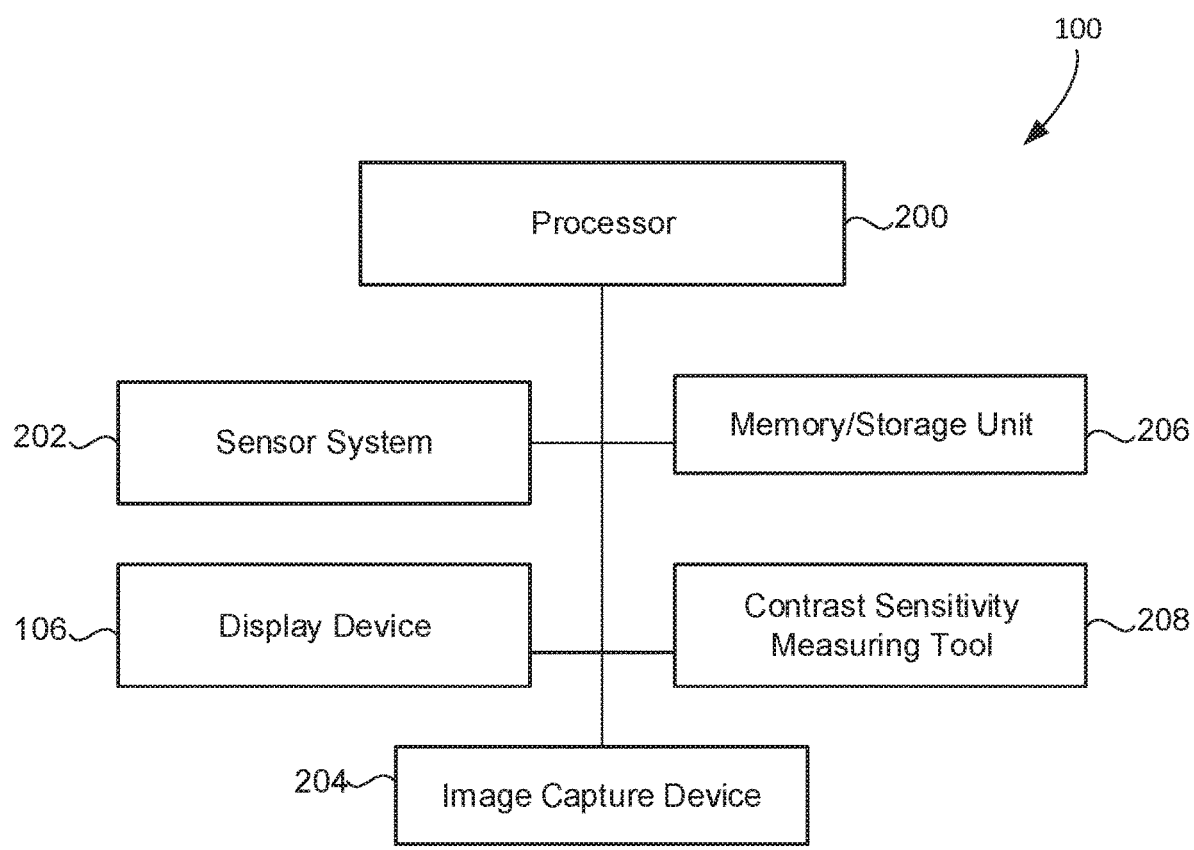
FIG. 2 is a schematic diagram of the display system of FIG. 1.

FIG. 2 shows a schematic diagram of imaging system 100, which can include a processor 200 and a sensor system 202. The processor 202 can execute the various steps disclosed herein. The sensor system 202 can include sensors to detect luminance values for the ambient light 104. The sensor system 202 can include one or more photodetectors, optical sensors, or other appropriate sensors responsive to visible light. The imaging system 100 can also include the display device 106, an image capture device 204, or both the display device 106 and the image capture device 204. The display device 106 can present visual information (e.g., images, alphanumeric information, and/or other graphical information) to the viewer 102 on a display. The image capture device 204 can be, for example, a camera that captures images of an environment.

Values of pixel luminance measured and/or modified as part of the processing techniques described herein can correspond to pixels of the information presented by the display device 106, or can correspond to pixels of the image information captured by the image capture device 204. The imaging system 100 can include a memory or storage unit 206 that stores instructions corresponding to the various method steps disclosed herein, for execution by the processor 200. Unit 206 can also store luminance values, e.g., target and/or background luminance values corresponding to individual pixels of display or captured information, which can be retrieved to perform various computational steps, as will be described further below. Optionally, the imaging system 100 can include a contrast sensitivity measuring tool 208 to determine information about contrast sensitivity of the individual viewer 102. However, in many cases, contrast sensitivity values for a standard or average viewers may be used.

Display Devices

Figure 3:
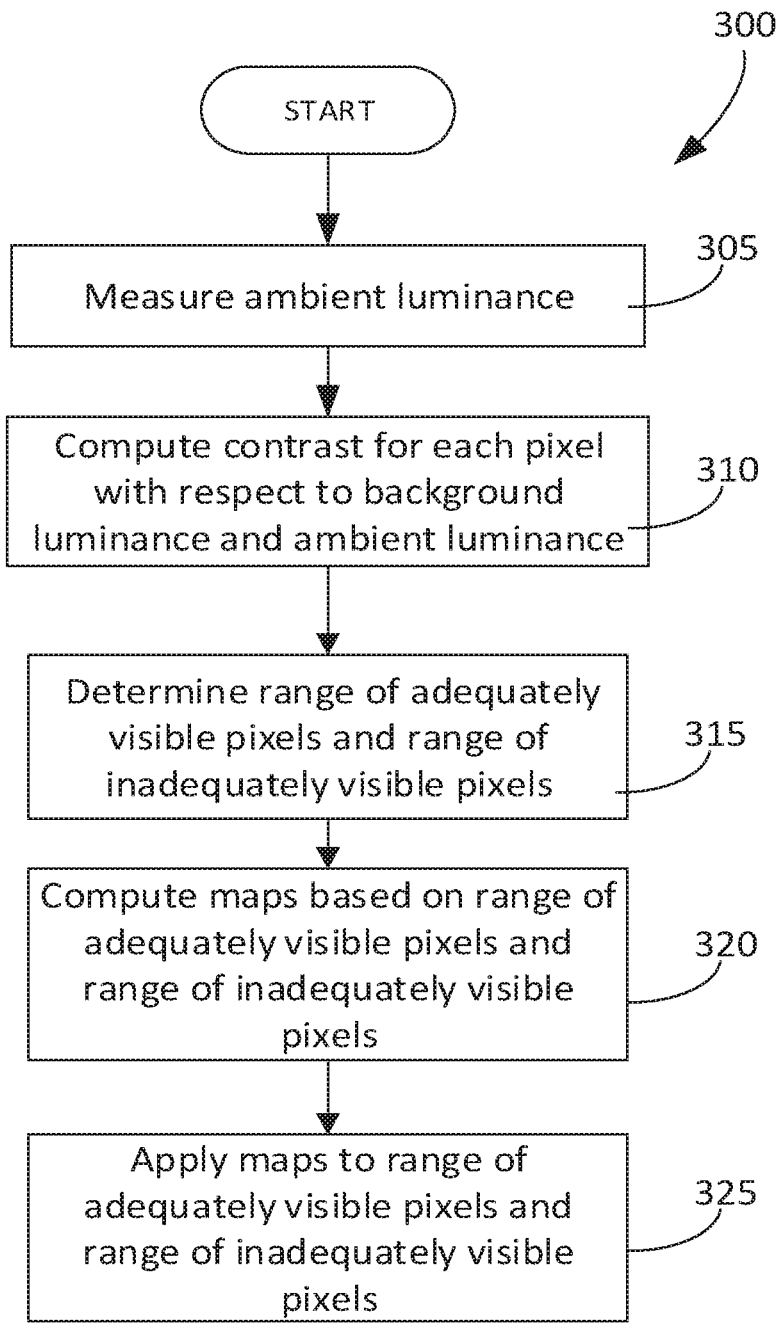
FIG. 3 is a flow chart showing a series of steps for adjusting pixel values on a display device to improve the display of information on the device.

FIG. 3 is a flow chart of an example process 300 that includes a series of steps executable by the processor 200 to process display information for improved visibility by the viewer 102. The technique shown in FIG. 3 uses Weber Contrast values calculated as shown in Equations (4) and (5) to process display information, and to output the processed information on a display device (e.g., display device 106) that is viewable by a viewer.

At the start of process 300, processor 200 obtains information about ambient light from the sensor system 202 and the effect of the ambient light on a set of pixels on the display device 106 or the image capture device 204. This information can be obtained in various ways. In some embodiments, for example, as shown in step 305, processor 200 activates sensor system 202 to measure ambient light luminance values. As discussed above in connection with FIG. 1, ambient light measurements are typically performed with the display device 106 or the image capture device 204 de-activated to minimize the impact of light emitted by the display device 106 or the image capture device 204 on the measured ambient light levels. For each pixel on the display device 106 or the image capture device 204 that is used to display or capture information, the sensor system 202 measures a reflected luminance value and a transmitted luminance value, which together constitute the ambient luminance corresponding to that pixel. In some embodiments, in step 305, the sensor system 202 can also be used by processor 200 to measure target and background luminance values for pixels of the display device 106 or the image capture device 204. However, pixel target and background luminance values can also be retrieved from a storage unit (e.g., storage unit 206).

Next, in step 310, processor 200 computes one or more Weber Contrast values for each pixel. To do so, processor 200 first obtains information about target luminance values and background luminance values for each pixel of interest. For each pixel of interest, the target luminance value can be taken by processor 200 to correspond to the pixel's output luminance value. In other words, each pixel's luminance corresponds, for purposes of determining the Weber Contrast value, to the nominal luminance value for the pixel in the scene, image, or information that is being displayed.

In step 310, processor 200 also determines a background luminance value for each pixel of interest. In some embodiments, for example, the background luminance value for each pixel can be measured by processor 200 using sensor system 202 under conditions in which ambient light is not present. For example, display device 106 or image capture device 204 can be placed in a light-excluding enclosure, and each nominal pixel output value (for display device 106) can be adjusted to a value of zero. The background luminance for each pixel also can be estimated by computing an average of the pixel luminance values surrounding the target pixel using the gamma function of the display, or directly measured by the process 200. Processor 200 can then use sensor system 202 to measure the luminance value for each pixel of display device 106 or image capture device 204. Alternatively, for display devices or image capture devices for which such measurements have already been performed, background luminance values for each pixel can be retrieved as stored calibration information.

Continuing in step 310, for each pixel, the contrast value (i.e., the Weber Contrast value from Equations (4) and (5)) is determined as a function of the pixel's target, background, and ambient luminance values. As discussed above, the computed Weber Contrast value provides a measure of contrast for each pixel that takes account of the viewer's adaptive response to changing ambient luminance levels. Processor 200 computes the Weber Contrast value for each of the pixels.

Based on the contrast values computed at step 310, the processor 200 can then determine in step 315 a range of pixels considered to be adequately visible (e.g., providing contrast greater than the human contrast threshold) and a range of pixels considered to be inadequately visible (e.g., providing contrast less than the human contrast threshold). In some embodiments, for example, processor 200 determines these ranges by comparing the Weber Contrast values for each of the pixels determined in step 310 to a contrast value corresponding to a general human visual contrast threshold. Pixels with Weber Contrast values that are below the threshold are designated by processor 200 as inadequately visible, while pixels with Weber Contrast values that are above the threshold are designated as adequately visible. By performing a pixel-by-pixel comparison, processor 200 can identify two subsets of pixels corresponding to inadequately and adequately visible pixels, respectively.

Next, in step 320, processor 200 computes maps based on the ranges of inadequately and adequately visible pixels. In general, the process of computing a map refers to generating or parameterizing a functional form that takes as its input a pixel luminance value and outputs a modified pixel luminance value. Computing a map is analogous to determining parameters of a mathematical transformation that converts input pixel luminance values to output pixel luminance values. In step 320, processor 200 computes one or more maps to adjust the target or background luminance values of the pixels such that at least some of the pixels that were determined to be inadequately visible in step 315 are, following the transformation, adequately visible.

In general, processor 200 can compute a variety of different maps to adjust pixel target or background luminance values. For example, when a see-through display is positioned in outdoor, the pixel values originally mapped to lower luminance range are remapped to the higher luminance range, and the rest of the pixel values used to be mapped to the higher luminance range are adjusted to keep the same or at least similar to the Weber contrast of the displayed image. Then, at step 325, processor 200 applies the one or more maps computed in step 320 to the luminance values of the inadequately visible pixels (and, in some embodiments, to the luminance values of the adequately visible pixels) to adjust target or background luminance values of at least some of the previously inadequately visible pixels such that these pixels are now adequately visible. As an example, a map applied to the range of inadequately visible pixel values can compress the dynamic range of the luminance values for the inadequately visible pixel values, and a map applied to the range of adequately visible pixel values can stretch the dynamic range of the luminance values for the adequately visible pixel values.

In embodiments in which the display device 106 presents visual information, the one or more maps are applied to the raw pixel target or background luminance values (i.e., the input information) to generate adjusted pixel target or background luminance values (i.e., the output information) which are then displayed on the display device 106. As such, the displayed information is made more easily discernable for a viewer.

In embodiments in which the image capture device 204 captures an image, the one or more maps are applied to the raw pixel luminance values (i.e., the input information directly from an image sensor) to generate output pixel luminance values, which constitute the image (i.e., output) information.

In certain embodiments, modified Weber Contrast values can be used to determine values of a metric used to indicate or evaluate performance of a display device, such as displace device 106. In particular, the display contrast performance metric can be based on a determination of an average ratio of surviving or visible pixels over all of the background luminance values.

Figure 4:
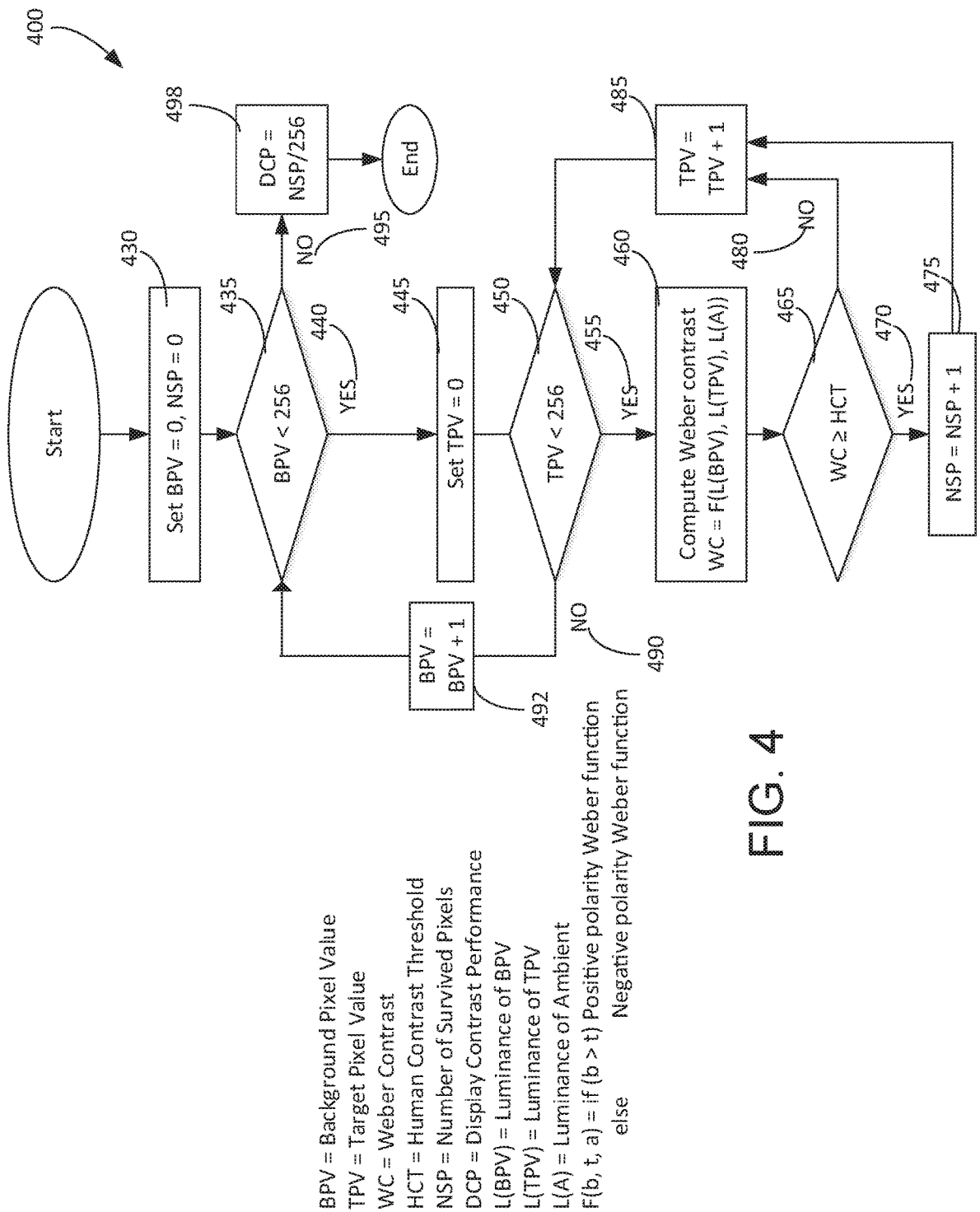
FIG. 4 is a flow chart showing a series of steps for determining display performance based on a modified Weber contrast function.

In general, such metrics can be computed in a variety of ways. FIG. 4 is a flow chart 400 showing a series of example steps that can be implemented to calculate a display contrast performance metric. While the process 400 is described below with respect to an 8-bit, 256-value digital pixel display or imaging system, other bit depths can also be used, with appropriate modification to the steps of the process.

First, in step 430, the processor 200 sets the background pixel value (BPV) and the number of survived pixels (NSP) to zero. The processor 200 then determines (step 435) whether the number of background pixels exceeds 256 (for 8-bit display information), e.g., determines whether each of possible values of the background pixels has been considered, and then proceeds to set (step 445) the target pixel value (TPV) to zero.

The processor 200 next checks (step 450) whether each of the target pixel values for the given background pixel value has been considered. Because the target pixel value has initially been set to zero the processor 200 determines (step 455) that the target pixel value is less than 256 and proceeds to compute (step 460) the modified Weber contrast value for the target pixel value.

The processor 200 then determines (step 465) whether the modified Weber contrast value for the target pixel luminance value is less than a human contrast threshold (HCT) value. The human contrast threshold can be a predetermined value corresponding to a human contrast threshold expected for a typical human viewer, and can be entered by the viewer or retrieved from a storage unit (e.g., unit 206). If the processor 200 determines (step 470) that the modified Weber Contrast value is greater than the human contrast threshold, the processor 200 increments (step 475) a count for the number of surviving pixels NSP by 1. If the processor 200 determines (step 480) that the modified Weber contrast value is less than the human contrast threshold, the processor 200 does not increment the count for the number of surviving pixels.

The processor 200 then increments (step 485) the target pixel value TPV by 1. The processor 200 repeats the foregoing steps until each of the target pixel values for a given selected background pixel value has been considered. After the processor 200 determines (step 490) that the target pixel value has reached 256, the processor proceeds to increment (step 492) the background pixel value BPV by 1.

The processor 200 then repeats steps 435 to 492 until each of the background pixel values up to 256 has been considered. The processor 200 then determines (step 495) that the value of the background pixels has reached 256 in step 435. At this point, the processor 200 has computed the total number of surviving pixels NSP among all of the target pixel values TPV for each of the background pixel values BPV. Using the number of surviving pixels NSP, the processor 200 then computes (step 498) a display contrast performance by dividing the number of surviving target pixel values NSP by the number of available target-background combinations.

The display contrast performance, DCP, can be indicative of how adequately visible the displayed information is for a viewer.

In some embodiments, processor 200 is configured to improve or optimize the display contrast performance value by transforming the target luminance values of pixels, for example using the process 300, so that a greater portion of the pixels are adequately visible, as described previously. For example, processor 200 can apply one or more maps to pixel target luminance values to increase the number of pixels that are determined to be adequately visible. A gamma setting can be used to determine luminance ranges that correspond to adequately and inadequately visible pixels, and pixel target luminance values (e.g. in a dark saturated or light saturated image) can be mapped to the adequately visible pixel luminance range. Some or all of the pixels that are determined to be inadequately visible can be modified in this manner. Additionally, the range of luminance values corresponding to the adequately visible pixels can be compressed based on the overall amount of scaling performed on the inadequately visible pixels, so that in some embodiments, all pixels that are used to display information fall within a range of luminance values that are perceptible by the viewer. In this manner, the DCP value for a given display of image information, or for a set of image information captured by an imaging device, can be improved.

Figure 5:
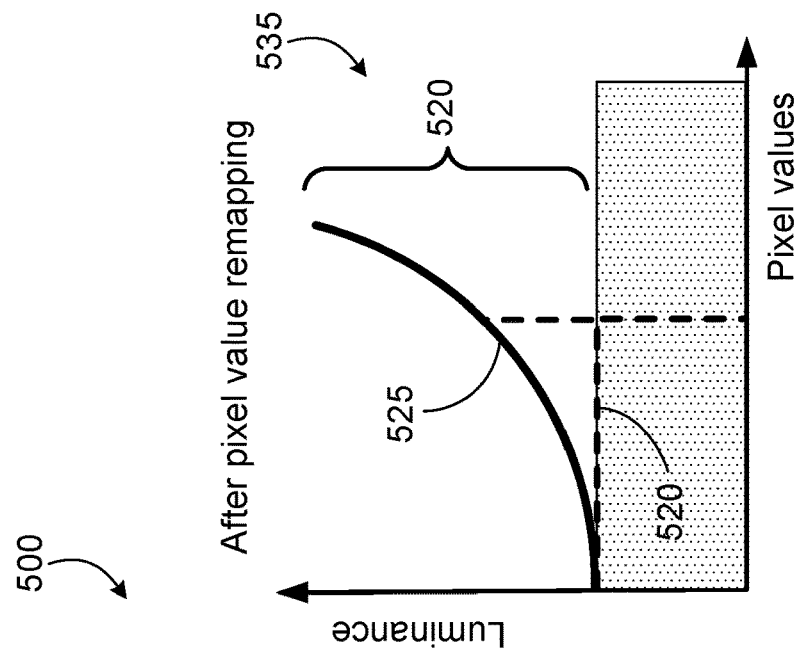
FIG. 5 is schematic diagram showing a process for remapping pixel values on a display device.
Figure 5:
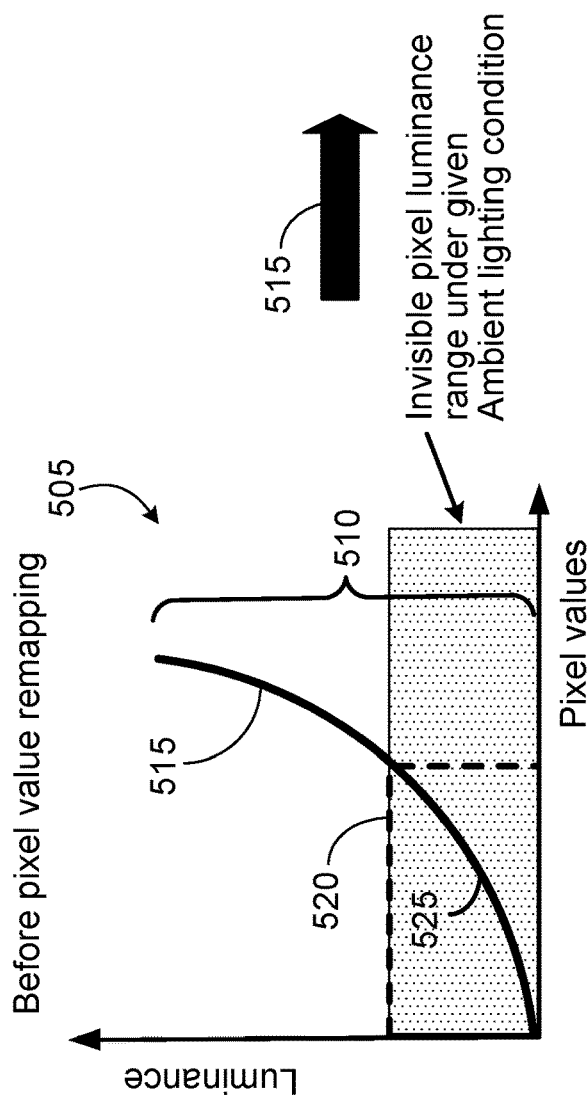

FIG. 5 schematically depicts a process 500 for adjusting display information, e.g., by adjusting the dynamic ranges of pixel values to improve visibility of the display information. For example, the process 500 can be implemented as part of step 320 and 325 of FIG. 3. Graph 505 shows luminance values of different pixel values. The graph 505 shows that the pixel values have luminance values spanning a total luminance range 510. Under a given ambient lighting condition, an adequately visible range of pixel values 515 is above a luminance threshold 520, and a range of pixel values that are inadequately visible, 525, are below the luminance threshold 520. In particular, the luminance of the pixel values within the inadequately visible range 525 are not adequately high for a typical human viewer to see discern the pixels.

The processor 200 can remap the luminance values of the pixels to improve a viewer's ability to perceive the display information. Graph 535 shows the luminance values for the pixels after the remapping is performed. In particular, the processor 200 remaps the inadequately visible pixel range 525 in graph 505 such that the luminance values of the pixels within the new range 530 are above the luminance threshold 520. In some cases, the processor 200 can compress the total luminance range 520. The adequately visible pixel range 515 can also be compressed based on an amount of the overall remapping applied to the inadequately visible pixel range 525.

That is, the remapping or scaling of pixel target luminance values can be applied to pixels corresponding to the inadequately visible range 525, or to pixels that fall within both the inadequately visible range 525 and the adequately visible range 515. Pixels with target luminance values that correspond to the inadequately visible range 525 are remapped or scaled so that some or all of the remapped or scaled pixels have (new) target luminance values that equal or exceed the contrast threshold 520. As a result, in some embodiments, all of the pixels used to display information will have target luminance values within a range that is bounded by or exceeds the contrast threshold 520.

In addition to remapping or scaling target luminance values for pixels that correspond to range 525, target luminance values can also be remapped or scaled for pixels that correspond to range 515. As shown in graph 535, for example, pixels with target luminance values within range 515 can be remapped or scaled, so that a larger number of pixel target luminance values (e.g., in graph 535, all of the remapped pixel target luminance values) fall within the adequately visible range 540. Thus, the process of remapping or scaling pixel target luminance values can include remapping pixel target luminance values at the low end of a range of values of pixel luminance and/or remapping pixel target luminance values at the high end of the range. In some embodiments, the remapping procedure can effectively correspond to a compression of the total range of pixel target luminance values to a smaller range in which a larger number (e.g., all) of the pixels used to display visual information have target luminance values that exceed a luminance threshold value. While this example is described with respect to target luminance values, in some implementations, background luminance values can alternatively or additionally be remapped.

Diagram 500 depicts a remapping process that can be used during image acquisition where a high dynamic range real world scene is captured as a low dynamic range image. The process can enhance contrast perception, and by considering the human contrast threshold, the process can lead to images that correspond more closely to how the human vision system would perceive the real world scene. The remapping process can be applied to a captured image as a rendering process for a display, e.g., for the display device 106.

In some embodiments, the process 300 can include automatically controlling brightness for a mobile display, for example, a see-through or an opaque display. The processor 200 can control the display device 106 to maintain or enhance visibility for given viewing conditions in accordance to a viewer's contrast perception, such that the images shown on the display can be more easily observed by the viewer. The automatic adjustments to the brightness can be executed based on display gain values empirically measured using, for example, optical sensors of the sensor system 202. These values can vary as the ambient lighting in the environment changes, which can also be detected using optical sensors of the sensor system 202. The process 300 can include estimating visibility of pixel values under the given ambient viewing condition. The estimation can be used to control the brightness gain for each pixel value such that visibility of the display information is adequate under various ambient lighting condition. In this regard, the adjustments to the pixel luminance values can be selected to increase the amount of image information that can be conveyed to the viewer even in the presence of ambient light conditions that may cause display information to be difficult to perceive.

In some embodiments, if the display device 106 includes a see-through display, the processes 300, 400, and/or 500 can increase the adequately visible pixel values by controlling the level of visibility of the see-through display. In see-through displays, visibility of the information can have a greater dependence on brightness of a scene behind the display, thus leading to a greater luminance value for $L_{Transmitted}$. The processor 200 can implement a process that serves as an adjustable or active light blocking filter for the see-through view. The processor 200 can provide a suitable level of light blocking so that the see-through view can be visible while maintaining adequate visibility of the see-through display.

In some embodiments, contrast sensitivity measurements can be performed using the contrast sensitivity measuring tool 208. The viewer can use the contrast sensitivity measuring tool 208 to determine a contrast sensitivity level unique to the individual viewer. The human contrast threshold to which the Weber contrast value is compared at steps 320 and 465 can be selected to be matched to the contrast sensitivity unique to the viewer. The automatic display brightness control can be optimized for each individual viewer's vision condition based on the contrast sensitivity for the individual viewer.

The contrast sensitivity measuring tool 208 can be a computerized vision system using, for example, low contrast letters or other appropriate methods to determine contrast sensitivity for the viewer. In certain embodiments, the contrast sensitivity measuring tool 208 can be a vision chart usable for determining the contrast sensitivity. The contrast sensitivity can be input by the viewer into the processor 200 to enable the processor 200 to use the contrast sensitivity to determine the human contrast threshold to be used during computation of the display contrast performance ratio.

In some embodiments, the processes 300, 400, and/or 500 can be modified for visually impaired users by applying a reduced contrast sensitivity threshold instead of a vision contrast sensitivity threshold for an average human. The reduced contrast sensitivity threshold can lead to a pixel-luminance mapping (Gamma function) more suitable for adequate image visibility for a visually impaired user. In this case, the inadequately visible pixel values under contrast threshold can be remapped to the visible pixel range.

As described above, the display device 106 can be, for example, a head mounted display, a heads-up display, a mobile display, or other appropriate display devices. The processes 300, 400, and/or 500 can be used to improve visibility of alphanumeric information on the display device 106 such as under various ambient light conditions, for example, indoor, outdoor, and nighttime light conditions. In embodiments in which the display information includes alphanumeric information, the visibility of alphanumeric information can be estimated by the processes 300, 400, and/or 500, with one or more fixed background pixel values (e.g., 1 background pixel value for a monotone background, less than the total number of available background pixel values) under various ambient light conditions. The processor 200 can automatically set target or background pixel values corresponding to the pixel value for the alphanumeric information (e.g. 2 dB above the human contrast threshold).

Imaging Devices

While the foregoing methods can be applied to a wide variety of display devices, they can also be applied to image capture devices such as cameras (e.g., image capture device 204). In particular, the steps shown in flow charts 300 and 400 can be performed by an on-board electronic processor in an image capture device at the hardware level to improve the perception of contrast in images obtained by one or more sensors of the device. Remapping or rescaling procedures, such as those shown in FIG. 5, can be performed to adjust raw pixel target or background luminance values measured by the device's imaging sensor. In this manner, image information acquired by the one or more sensors is adjusted so that when viewed externally by a human, improved perception of contrast in the image information by the viewer is achieved. In addition to obtaining images, the one or more on-board sensors of an image capture device can be used to measure ambient light levels (as discussed above). Alternatively, or in addition, image capture devices can include one or more dedicated sensors, connected to an on-board electronic processor, for measuring ambient light levels.

Other on-board image processing techniques can also be combined with the foregoing methods in image capture devices to improve contrast perception. In some embodiments, for example, non-uniform light level quantization can be applied to the sensor so that for extreme dark or bright areas, more bits describing the light level can be allocated to quantize the light level to enable adequate visibility.

Hardware and Software Implementations

Figure 6:
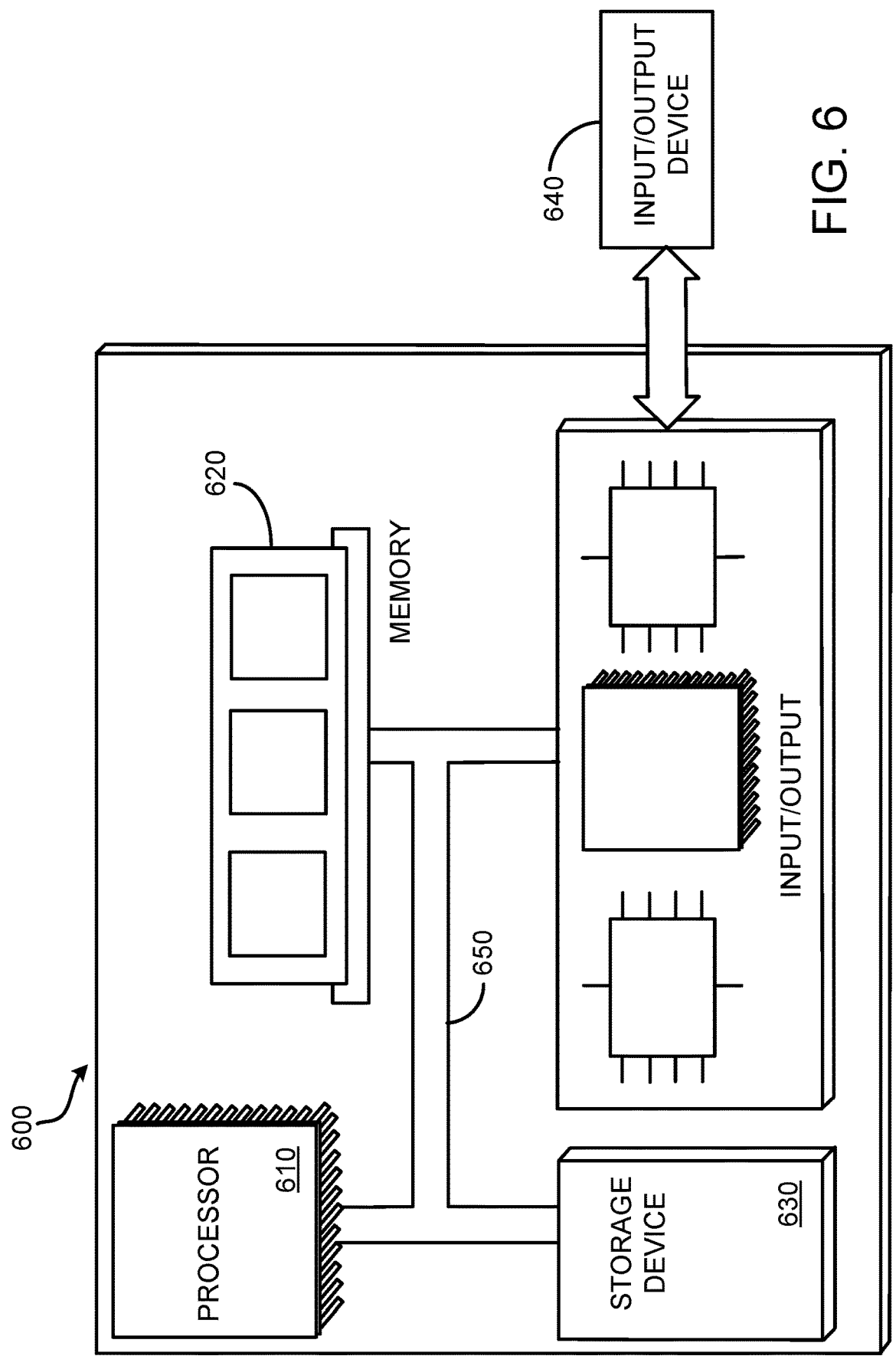
FIG. 6 is a schematic diagram showing components of a computational system that can be used to carry out various processing steps of the methods disclosed herein.

FIG. 6 is a schematic diagram of a computer system 600. The system 600 can be used to perform some or all of the steps of any of the methods disclosed herein. The system 600 can be incorporated in various computing devices such as a desktop computer, a server, and/or a laptop computer. All of or portions of the system 600 can be incorporated into, for example, the external device 215, the central processor 200, the delivery processor 230, the secondary delivery processor 235, and other computing devices described herein. The system 600 includes a processor 610, a memory 620, a storage device 630, and an input/output device 640. Each of the components 610, 620, 630, and 640 are interconnected using a system bus 650.

The processor 610 is capable of processing instructions for execution within the system 600. In some embodiments, the processor 610 is a single-threaded processor. In certain embodiments, the processor 610 is a multi-threaded processor. The processor 610 is capable of processing instructions stored in the memory 620 or on the storage device 630 to display graphical information for a user interface on the input/output device 640. The processor 200 can include similar processing capabilities as the processor 610.

The memory 620 stores information within the system 600. In some implementations, the memory 620 is a computer-readable medium. The memory 620 can include volatile memory and/or non-volatile memory. The storage device 630 is capable of providing mass storage for the system 600. In some embodiments, the storage device 630 is a computer-readable medium. In certain embodiments, the storage device 630 may be a floppy disk device, a hard disk device, an optical disk device, a tape device, or another type of writeable medium. The memory 620 and/or the storage device 630 can store, for example, information to the contrast threshold for a given viewer or user. The storage device 630 can include parameters that are predefined or that are stored after use of, for example, the contrast sensitivity measuring tool 208. In some embodiments, the memory 620 also stores luminance information for each of the pixel levels.

The input/output device 640 implements input/output operations for the system 600. In some embodiments, the input/output device 640 includes a keyboard and/or pointing device. In some embodiments, the input/output device 640 includes a display unit for displaying graphical user interfaces and/or display information. In some implementations the input/output device can be configured to accept verbal (e.g., spoken) inputs. The input/output device 640 can include inputs from the sensor system 202, the image capture device 204, and the contrast sensitivity measuring tool 208. In some examples, the input/output device 640 enables the user to enter in a contrast threshold.

The features described can be implemented in digital electronic circuitry, or in computer hardware, firmware, or in combinations of these. The features can be implemented in a computer program product tangibly embodied in an information carrier, e.g., in a machine-readable storage device, for execution by a programmable processor; and features can be performed by a programmable processor executing a program of instructions to perform functions of the described implementations by operating on input data and generating output. The described features can be implemented in one or more computer programs that are executable on a programmable system including at least one programmable processor coupled to receive data and instructions from, and to transmit data and instructions to, a data storage system, at least one input device, and at least one output device. A computer program includes a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Computers include a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as those discussed above. The relationship of client and server arises by virtue of computer programs running on the respective computers and having a client-server relationship to each other.

The processor 610 carries out instructions related to a computer program. The processor 610 may include hardware such as logic gates, adders, multipliers and counters.

The processor 610 may further include a separate arithmetic logic unit (ALU) that performs arithmetic and logical operations.

EXAMPLES

The subject matter of the present disclosure is further described in the following example, which does not limit the scope of the claims.

In this example, contrast values of uniform luminance targets were computed. The uniform luminance targets were presented over a uniform background on hypothetical displays that could present pixels of luminance range from 0.1 cd/m$^2$ (candela per square meter) to 500 cd/m$^2$. The displays were placed under various ambient lighting conditions, resulting in uniform ambient luminance (1 cd/m$^2$ to 10,000 cd/m$^2$) directly reflected to the viewer. Using the sampling sphere configuration described in Reference 2, this ambient luminance range covered display viewing conditions of from dark nighttime or indoor darkroom to daylight outdoor conditions.

Figure 7:
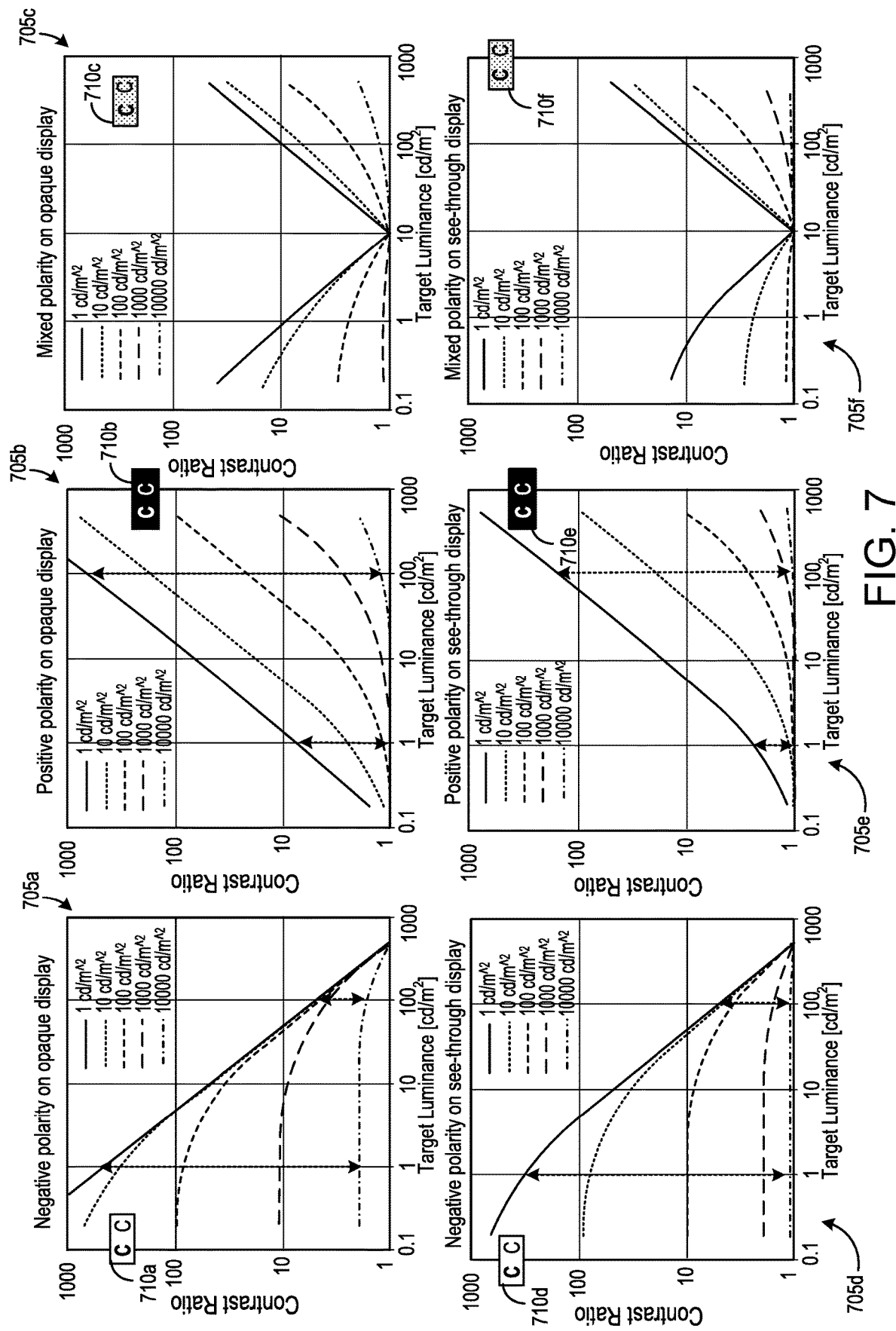
FIG. 7 shows a series of plots of contrast ratio as a function of target luminance for various examples of displayed information and under various levels of ambient light.

FIG. 7 illustrates changes in the contrast ratio (CR) of opaque displays and see-through displays. Graphs 705a, 705b, 705c depict these changes for the opaque displays, and graphs 705d, 705e, 705f depict these changes for the see-through displays. Graphs 705a and 705d show the changes for displaying a negative polarity contrast condition. Graphs 705b and 705d show the changes for displaying a positive polarity contrast condition. Graphs 705c and 705f show the changes for displaying a mixed polarity contrast condition. The contrast ratio changed for the opaque display and the see-through display under varying ambient illumination conditions, which resulted in uniform ambient luminance of 1 cd/m$^2$ to 10,000 cd/m$^2$. Emitted screen background luminance was assumed to have a maximum illuminance of 500 cd/m$^2$ for the displays used for the results in graphs 705a and 705d, a minimum illuminance of 0.1 cd/m$^2$ for the displays used for the results in graphs 705b and 705e, and an intermediate illuminance (e.g., halfway between the maximum illuminance and the minimum illuminance on a log scale) of 10 cd/m$^2$ for the displays used for the results of graphs 705c and 705f.

Example uniform luminance targets 710a-710f corresponded to letters shown in these various ambient lighting conditions. In particular, the uniform luminance targets 710a and 710d correspond to letters shown in the negative polarity contrast condition. The uniform luminance targets 710b and 710e correspond to letters shown in the positive polarity contrast condition. The uniform luminance targets 710c and 710f correspond to letters shown in the mixed polarity contrast condition.

The graphs 705a-705f depict the changes under various ambient luminance conditions (as specified in the insets legends of each of the graphs 705a-705f). The representative image content for the positive, negative, and mixed polarity contrast conditions are illustrated in the inset. The impact of the ambient light on low and high luminance targets are indicated as the arrows representing the changes in the contrast ratios in maximal ambient light variation.

In this example, calculations included assumptions that did not have any significant effect on generality of the results described herein. For the see-through display condition, the reflected luminance ($L_{Reflected}$) was assumed to be 5% of the ambient luminance and the transmitted luminance ($L_{Transmitted}$) was assumed to be 50%. For the opaque display condition, $L_{Reflected}$ was assumed to be 5% and $L_{Transmitted}$ was assumed to be 0% of the ambient luminance. These values were consistent with the range of transmittance and reflectance of the LCD and OLED displays measured in Reference 3.

As shown in FIG. 7, for each contrast polarity, the onscreen emitted background luminance ($L_{Background}$) was assumed to be 500 cd/m$^2$ (pixel value=255), 0.1 cd/m$^2$ (pixel value=0), and 10 cd/m$^2$ (in between). The target luminance was assumed to vary over the available luminance range (pixel value 1-254). With these configurations, for given maximum or minimum luminance background, as the target luminance increased (as in the negative polarity contrast condition) or decreased (as in the positive contrast polarity condition) such that it approached the background luminance value, the contrast ratio decreased to its minimum value of 1.

In each of the graphs 705a-705f of FIG. 7, it can be observed that the contrast ratio of given luminance targets decreased as the ambient luminance increased, as the dotted arrows in graphs 705a and 705b depict. For both the negative contrast conditions (see graphs 705a and 705d) and the positive (see graphs 705b and 705e) contrast polarity conditions, the ambient light resulted in a reduction of the contrast ratio due to the change in the ambient light conditions. The reduction of the contrast ratio is larger at the high contrast ratio target range (0.1 cd/m$^2$ to 10 cd/m$^2$) than low contrast ratio target range (10 cd/m$^2$ to 500 cd/m$^2$), as shown in each of graphs 705a to 705f.

The contrast ratio was considered as a measure of letter visibility, and the display presented both high and low contrast letters of the same contrast polarity. Graphs 705a to 705f demonstrate that when the display viewed indoors was moved outdoors under bright sunlight conditions, the reduction in the visibility of the high contrast letter was much larger than the reduction in the visibility of the low contrast letter. At certain ambient luminance conditions, the visibility of the high contrast letter decreased relative to the visibility of the low contrast letter such that both would be substantially invisible to the human viewer. However, in real world application of displays, higher (negative) contrast content is resilient to the impact of the ambient light, while the low contrasts contents are more vulnerable to the ambient light condition changes.

FIG. 7 further shows that the patterns of contrast ratio change under the same changes in ambient luminance condition are different for the two contrast polarity cases. The curves illustrating the contrast ratio changes in negative polarity contrast conditions (see graphs 705a and 705d) and positive polarity contrast conditions (see graphs 705b and 705e) transition to substantially a 1:1 line in a concave manner and a convex manner, respectively. The mixed contrast polarity condition (see graphs 705c and 705f) illustrate the difference in the contrast ratio with respect to the two target polarities. In some examples, as described in References 5 and 6, the contrast perception of positive and negative polarity can be almost symmetrical.

The contrast ratio-based visibility predictions shown in FIG. 7 do not adequately account for the function of the viewer's visual system. As discussed previously, human vision achieves high dynamic range through retinal adaptation to different luminance ranges. As the overall scene luminance increased or decreased, the viewer's adaptation level normalized the target to background luminance difference, and perceived the same contrast. This concept of contrast constancy is described in greater detail in References 7 and 8. For example, a large absolute luminance difference displayed under high overall luminance condition is perceived to have the same contrast as a lower absolute luminance difference displayed under low overall luminance condition.

Figure 8:
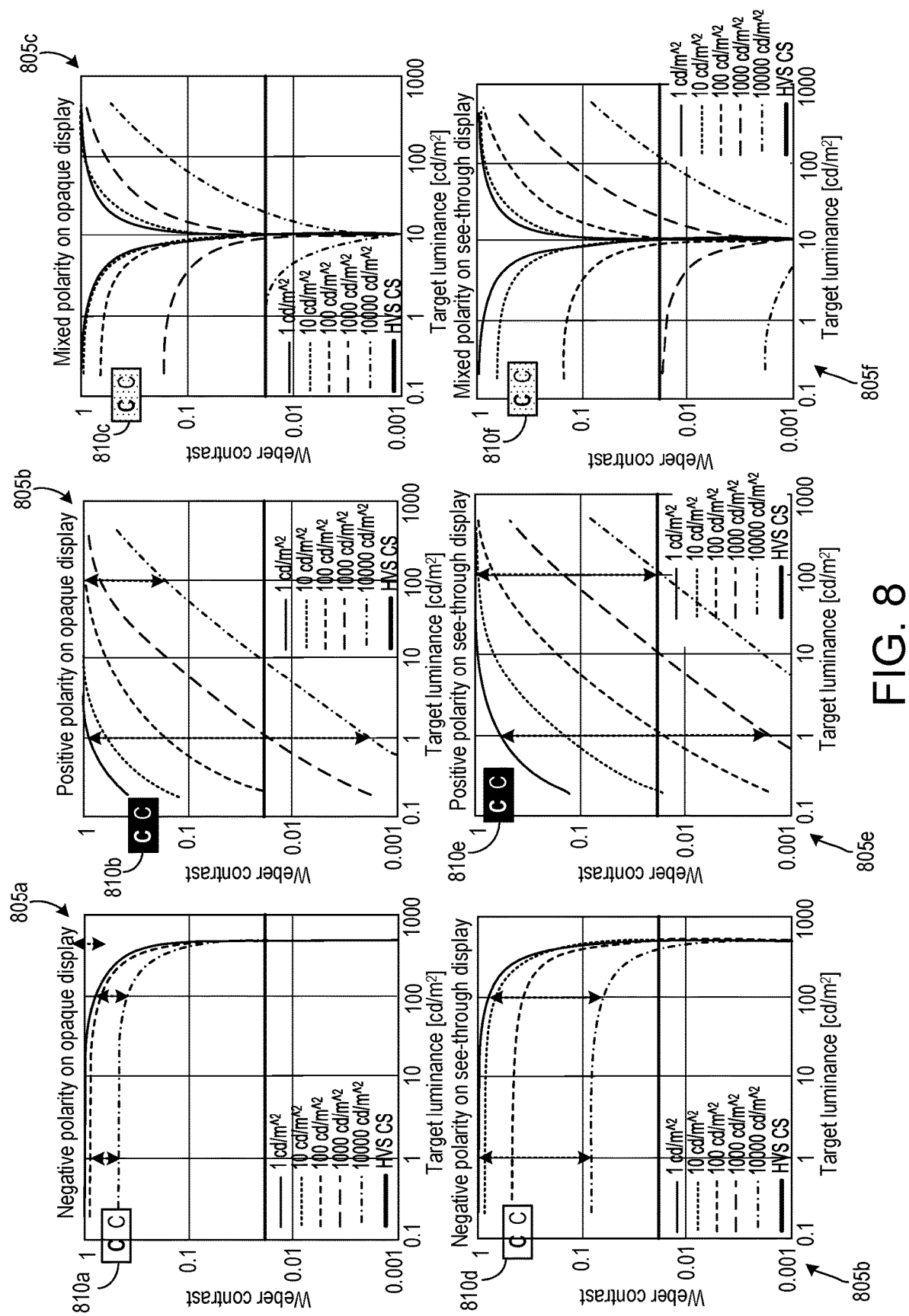
FIG. 8 shows a series of plots of modified Weber contrast as a function of target luminance for various examples of displayed information and under various levels of ambient light.

The modified Weber contrast function incorporates perceptual luminance adaptation in its definition and thus can automatically correct limitations of the contrast ratio-based target visibility measure. FIG. 8 shows plots of the same hypothetical see-through and opaque displays under the same ambient luminance conditions as in FIG. 7. FIG. 8 differs from FIG. 7 in that the contrast values were calculated using the modified Weber contrast (WC) definition. Elements of this modified Weber definition are described in Reference 4.

Graphs 805a, 805b, 805c depict changes in the Weber contrast value for the opaque displays, and graphs 805d, 805e, 805f depict these changes for the see-through displays. Graphs 805a and 805d show the changes for displaying the negative polarity contrast condition. Graphs 805b and 805d show the changes for displaying the positive polarity contrast condition. Graphs 805c and 805f show the change for displaying the mixed polarity contrast condition. The WC changed for the opaque display and the see-through display under varying ambient illumination conditions, which resulted in uniform ambient luminance of 1 cd/m2 to 10,000 cd/m2. Emitted screen background luminance was assumed to have a maximum illuminance of 500 cd/m2 for the displays used for the results in graphs 805a and 805d, a minimum illuminance of 0.1 cd/m2 for the displays used for the results in graphs 805b and 805e, and an intermediate illuminance (e.g., halfway between the maximum illuminance and the minimum illuminance on a log scale) of 10 cd/m2 for the displays used for the results of graphs 805c and 805f.

In particular, the uniform luminance targets 810a and 810d corresponded to letters shown in the negative polarity contrast condition. The uniform luminance targets 810b and 810e corresponded to letters shown in the positive polarity contrast condition. The uniform luminance targets 810c and 810f corresponded to letters shown in the mixed polarity contrast condition.

A normal vision human's contrast sensitivity ($1/WC_{Threshold}$) corresponds to the lowest contrast threshold that he or she can see. The value can be between 1.73 and 1.99 in log scale, as described in Reference 9. The corresponding contrast threshold is shown in graphs 805a-805f. Any target with a Weber contrast value (including the impact of ambient light) below the threshold line was considered to be inadequately visible to the viewer. The horizontal line represented the contrast threshold of a normal human observer. The line was set to be equal to (1/WC)=1.8.

FIG. 8 shows that more dramatic contrast reduction occurred with the see-through display (see graphs 805d and 805e) than opaque displays (see graphs 805a and 805b) in the bright ambient conditions. A wider range of positive contrast display information on the opaque display maintained its visibility throughout the ambient light transition (as shown in graph 805b) than the same contrast contents on the see-through display (as shown in graph 805e).

Graphs 805c and 805f depict results in cases in which the images that were displayed were considered to be composed of both contrast polarities letters. For letters of the same contrast, the negative polarity letters decreased to Weber contrast levels below the contrast threshold for visibility to a human view as ambient light increased. Thus, as shown in this example, the use of the modified Weber contrast function described herein can provide an effective way to compensate for the ambient light. With increased ambient light, reducing the mean luminance, stretching the dynamic range of higher pixel values (corresponding to higher pixel luminance range), and compressing the dynamic range of the lower pixel values (corresponding to lower luminance values) can improve visibility for the human viewer. Such changes can maintain distinct contrast pixel values above the threshold for visibility as compared to examples in which the contrast computations do not consider visibility thresholds for human viewers.

The example described with respect to FIGS. 7 and 8 demonstrates the application of a process to determine display contrast performance using a Weber contrast-based visibility metric. For given ambient light conditions (e.g. dark, indoor, and outdoor), the process can include determining the contrast performance of a display in terms of how many pixel value combinations are adequately visible to a viewer. The process can include (i) measuring the luminance of each pixel value and ambient luminance as explained above; (ii) computing the Weber contrast for each pixel value with respect to a background level; (iii) computing the number of pixel values that survive after applying the human contrast threshold; (iv) repeating (ii) and (iii) for all possible background pixel values (0-255 for an 8-bit system); and (v) computing the average ratio of survived number of pixel values over all background conditions. The metric measures the dynamic range of visible contrasts that a display can generate under varying viewing conditions. The metric can depend not only on a display's ability to generate a brightest or darkest pixel, but also on the display-specific mapping of pixel value to luminance range.

Display assessments and modifications to pixel luminance values (e.g., via remapping) based on the Weber contrast function and a viewer's contrast sensitivity can lead to more realistic performance measure of a display in real-world viewing conditions where the ambient light level changes substantially, and to improved performance of the display itself (e.g., by making the information displayed thereon more easily perceptible by the viewer).

REFERENCES

The entire contents of each of the following references are incorporated herein by reference.
1. E. F. Kelley, M. Lindfors, J. Penczek, "Display daylight ambient contrast measurement methods and daylight readability", Journal of the Society for Information Display, 14(11), 1019-1030 (2006).
2. J. Penczek, E. F. Kelley, P. A. Boynton, "Optical Measuring Methods for Transparent Displays", In SID Symposium Digest of Technical Papers, 46(1), 731-734 (2015).
3. J. Penczek, E. F. Kelley, P. A. Boynton. "General Metrology Framework for Determining the Ambient Optical Performance of Flat Panel Displays", In SID Symposium Digest of Technical Papers, 46(1), 727-730 (2015).
4. A. D. Hwang, J. Jung, E. Peli, "Contrast and contrast sensitivity measures for positive and negative polarity targets", in preparation.
5. G. E. Legge, D. Kersten. "Light and dark bars; contrast discrimination". Vision Research, 23(5), 473-483 (1983).
6. D. A. Burkhardt, J. Gottesman, D. Kersten, G. E. Legge, "Symmetry and constancy in the perception of negative and positive luminance contrast". JOSA A, 1(3), 309-316 (1984).

7. E. Peli. "Suprathreshold contrast perception across differences in mean luminance: effects of stimulus size, dichoptic presentation, and length of adaptation". JOSA A, 12(5), 817-823 (1995).
8. E. Peli, J. Yang, R. Goldstein, A. Reeves. "Effect of luminance on suprathreshold contrast perception". JOSA A, 8(8), 1352-1359 (1991).
9. M. Mantyjarvi, T. Laitinen, "Normal values for the Pelli-Robson contrast sensitivity test", Journal of Cataract & Refractive Surgery, 27(2), 261-266 (2001).
10. E. Peli. "Display nonlinearity in digital image processing for visual communications". Optical Engineering, 31(11), 2374-2382 (1992).

OTHER EMBODIMENTS

A number of embodiments have been described. Nevertheless, it will be understood that various modifications may be made. Accordingly, other embodiments are within the scope of the claims.

What is claimed is:

1. An information display system, comprising:
a display device configured to display visual information to a viewer;
at least one sensor configured to measure information about ambient light in an environment surrounding the display device; and
an electronic processor connected to the display device and to the at least one sensor,
wherein during operation of the system, for a set of pixels of the display device that are used to display the visual information, the electronic processor is configured to:
obtain the information about the ambient light from the at least one sensor;
obtain information about target luminance values and background luminance values for the set of pixels;
obtain a contrast threshold value for the viewer;
determine a Weber contrast value for each one of the set of pixels;
determine a range of luminance values for a subset of the set of pixels for which the Weber contrast value of each pixel in the subset of the set of pixels is less than the contrast threshold value;
adjust luminance values for the set of pixels so that at least some members of the subset of the set of pixels have Weber contrast values, based on their adjusted target luminance values, that exceed the contrast threshold value; and
display the visual information on the display device using the members of the set of pixels with the adjusted luminance values.

2. The system of claim 1, further comprising a contrast sensitivity measurement apparatus, wherein the contrast sensitivity measurement apparatus is configured to determine the contrast threshold value for the viewer.

3. The system of claim 1, wherein the electronic processor is configured to adjust the luminance values for the set of pixels by remapping the luminance values to a range of luminance values for which corresponding Weber contrast values exceed the contrast threshold value.

4. The system of claim 1, wherein the electronic processor is configured to adjust the luminance values for the set of pixels by remapping the luminance values to a range of luminance values having a lower bounding luminance value for which a corresponding Weber contrast value is equal to the contrast threshold value.

5. The system of claim 1, wherein the electronic processor is configured to adjust the luminance values for the set of pixels by remapping at least some of the luminance values corresponding to pixels for which the Weber contrast value is less than the contrast threshold value to larger luminance values.

6. The system of claim 5, wherein the electronic processor is configured to adjust the luminance values for the set of pixels by remapping at least some of the luminance values corresponding to pixels for which the Weber contrast value is larger than the contrast threshold value to smaller luminance values.

7. The system of claim 1, wherein the electronic processor is configured to adjust the luminance values for the set of pixels by remapping at least some of the luminance values so that a range of luminance values for the set of pixels, defined by a difference between maximum and minimum luminance values among the set of pixels, is smaller after the adjustment than before the adjustment.

8. The system of claim 1, wherein for each one of the set of pixels that corresponds to a positive contrast polarity, the electronic processor is configured to determine the Weber contrast value based on a quotient comprising a numerator comprising the target luminance value of a pixel, and a denominator comprising a sum of the target luminance value of the pixel and an ambient luminance value of the pixel.

9. The system of claim 8, wherein the numerator comprises a difference between the target luminance value of the pixel and the background luminance value of the pixel.

10. The system of claim 1, wherein for each one of the set of pixels that corresponds to a positive contrast polarity, the electronic processor is configured to determine the Weber contrast value based on a term calculated according to:

$$WC_{Positive} = \frac{(L_{Target} - L_{Background})}{(L_{Target} + L_{Ambient})}$$

wherein $WC_{Positive}$ is the Weber contrast value in positive polarity, $L_{target}$ is the target luminance value of a pixel, $L_{background}$ is the background luminance value of the pixel, and $L_{ambient}$ is an ambient luminance value of the pixel.

11. The system of claim 1, wherein for each one of the set of pixels that corresponds to a negative display polarity, the electronic processor is configured to determine the Weber contrast value based on a quotient comprising a numerator comprising the target luminance value of a pixel, and a denominator comprising a sum of the background luminance value of the pixel and an ambient luminance value of the pixel.

12. The system of claim 11, wherein the numerator comprises a difference between the background luminance value of the pixel and the target luminance value of the pixel.

13. The system of claim 1, wherein for each one of the set of pixels that corresponds to a negative display polarity, the electronic processor is configured to determine the Weber contrast value based on a term calculated according to:

$$WC_{Negative} = \frac{(L_{Background} - L_{Target})}{(L_{Background} + L_{Ambient})}$$

wherein $WC_{Negative}$ is the Weber contrast value in negative polarity.

14. The system of claim 1, wherein the information about the ambient light comprises, for each one of the set of pixels, a reflected luminance value corresponding to ambient light reflected from a pixel, and a transmitted luminance value corresponding to ambient light transmitted through the pixel.

15. The system of claim 14, wherein the electronic processor is configured to obtain the information about the ambient light by:
deactivating the display device; and
using the at least one sensor to measure luminance values corresponding to ambient light reflected from, and transmitted through, the display device.

16. The system of claim 1, wherein the electronic processor is configured to identify the subset of the set of pixels for which the Weber contrast value is less than the contrast threshold value by:
for each one of the set of pixels, determining a set of Weber contrast values based on a target luminance value of a pixel, an ambient luminance value for the pixel, and a set of background luminance values for the pixel; and
identifying the pixel as a member of the subset of the set of pixels if at least one member of the set of Weber contrast values is less than the contrast threshold value.

17. A method for displaying information on a display device, the method comprising:
obtaining information about ambient light in an environment surrounding the display device;
for a set of pixels on the display device that are used to display the information, obtaining information about target luminance values and background luminance values for each of the pixels;
obtaining information about a contrast threshold value for a viewer of the display device;
determining a Weber contrast value for each one of the set of pixels;
determining a range of target luminance values for a subset of the set of pixels for which the Weber contrast value of each pixel of the subset of the set of pixels is less than the contrast threshold value;
adjusting luminance values for the set of pixels so that at least some members of the subset of the set of pixels have Weber contrast values, based on their adjusted luminance values, that exceed the contrast threshold value; and
displaying the information on the display device using the members of the set of pixels with the adjusted luminance values.

18. The method of claim 17, further comprising determining the contrast threshold value for the viewer.

19. An imaging device, comprising:
an image sensor configured to obtain an image; and
an electronic processor connected to the image sensor,
wherein during operation of the device, for a set of pixels corresponding to a first image obtained by the image sensor, the electronic processor is configured to:
obtain information about ambient light in an environment of the device;
obtain information about target luminance values and background luminance values for the set of pixels;
obtain a contrast threshold value;
determine a Weber contrast value for each one of the set of pixels;
determine a range of target luminance values for a subset of the set of pixels for which the Weber contrast value of each pixel of the subset of the set of pixels is less than the contrast threshold value;
adjust luminance values for the set of pixels so that at least some members of the subset of the set of pixels have Weber contrast values, based on their adjusted luminance values, that exceed the contrast threshold value; and
generate a second image based on the set of pixels and comprising the adjusted luminance values.

* * * * *